United States Patent
Chen et al.

(10) Patent No.: US 11,984,558 B2
(45) Date of Patent: May 14, 2024

(54) BUTTON-TYPE LITHIUM ION BATTERY AND METHOD FOR FABRICATING SAME

(71) Applicant: ZHONGSHAN ZHONGWANGDE NEW ENERGY TECHNOLOGY CO., LTD, Guangdong (CN)

(72) Inventors: Wei Chen, Guangdong (CN); Xuehua Huang, Guangdong (CN)

(73) Assignee: ZHONGSHAN ZHONGWANGDE NEW ENERGY TECHNOLOGY CO., LTD, Zhongshan (CN)

( * ) Notice: Subject to any disclaimer, the term of this patent is extended or adjusted under 35 U.S.C. 154(b) by 254 days.

(21) Appl. No.: 16/907,178

(22) Filed: Jun. 20, 2020

(65) Prior Publication Data
US 2021/0143484 A1 May 13, 2021

Related U.S. Application Data

(63) Continuation of application No. PCT/CN2020/087693, filed on Apr. 29, 2020.

(30) Foreign Application Priority Data

Nov. 11, 2019 (CN) .......................... 201911094423.3

(51) Int. Cl.
  *H01M 10/0587* (2010.01)
  *H01M 10/0525* (2010.01)
  *H01M 50/109* (2021.01)

(52) U.S. Cl.
  CPC ... *H01M 10/0587* (2013.01); *H01M 10/0525* (2013.01); *H01M 50/109* (2021.01)

(58) Field of Classification Search
  CPC .................... H01M 10/0587; H01M 50/109
  See application file for complete search history.

(56) References Cited

U.S. PATENT DOCUMENTS 9,461,296 B2 * 10/2016 Kohno ................ H01M 50/516
2020/0280025 A1 * 9/2020 Li ........................ H01M 50/116

FOREIGN PATENT DOCUMENTS

CN   201773903 U    3/2011
CN   102064339 A *  5/2011
(Continued)

OTHER PUBLICATIONS

Zhao Ting, Zhang Xiang-j Lu Shi-gang.Effects of button cell shells on electrochemical performance test of Li-ion battery materials, Battery Bimonthly . Feb. 2013,43 (1) .p. 25-28, http://www.cnki.net.CN.

*Primary Examiner* — Daniel S Gatewood

(57) ABSTRACT

The disclosure provides a button-type lithium ion battery and a method for fabricating the same. The lithium ion battery includes a shell, a winding core, a center upright, a pole and tabs, wherein the shell is internally provided with a cavity, the winding core is arranged in the cavity, at least one end of the center upright is provided with an opening, the pole is arranged on the shell, the tabs are connected with the winding core, and the tabs extend to the inside of the opening and are electrically connected with the pole. According to the disclosure, the relatively thick pole is electrically connected with the winding core and then embedded into the center uptight so that the space inside the center upright is sufficiently utilized, the whole thickness of the shell is reduced and the utilization space of the battery is increased.

6 Claims, 3 Drawing Sheets

(56) References Cited

FOREIGN PATENT DOCUMENTS

| CN | 106159350 | * | 11/2016 |
| CN | 106159350 A | * | 11/2016 |
| CN | 110289451 A | | 9/2019 |

* cited by examiner

BUTTON-TYPE LITHIUM ION BATTERY AND METHOD FOR FABRICATING SAME

TECHNICAL FIELD

The disclosure pertains to the field of lithium ion batteries, and particularly to a button-type lithium ion battery and a method for fabricating the same.

BACKGROUND

With the development and evolution of electronic techniques, electronic devices, such as smart phones and new energy vehicles, have increasing demands on power supplies and rechargeable batteries. Where application of lithium ion batteries, lithium ion polymer batteries and the like is especially widespread, and lithium batteries can be applied to electronic products, electric tools, electric cars, smart wearing equipment, even in aviation industry and armament industry.

A button-type lithium battery also called a coin-type lithium battery, refers to a lithium battery whose shape is like a button. In general, it has a large diameter and is of a thin pancake shape having a thin thickness. The button-type lithium battery is obtained by dividing the lithium battery based on the shape, equivalently corresponding lithium batteries are classified as columnar batteries, square batteries, special-shaped batteries and the like. The button-type lithium battery not only can supply power in a form of single battery, but also can be used by combining a plurality of batteries into one or more battery packs, and has the advantages of small size, high specific capacity, stable voltage, durability and the like.

However, nowadays, people more and more depend on electronic products and put forward higher requirement on endurance of electronic product themselves, and the capacity of the battery becomes a bottleneck limiting the development of electronic products. The pole of the negative electrode of the button-type lithium battery in the prior art is large in whole thickness and almost occupies the whole metal cover body, leading to small effective utilization space of the inner cavity, low battery capacity and low actual commercial value.

SUMMARY

Aiming at the technical problem existing in the prior art, the disclosure provides a button-type lithium ion battery. The technical problem to be solved by the disclosure is how to improve the battery capacity of the button-type lithium ion battery.

The object of the disclosure can be realized through the following technical solution:

A button-type lithium ion battery, including a shell, a winding core, a center upright, a pole and tabs, wherein the shell is internally provided with a cavity; the winding core is arranged in the cavity; at least one end of the center upright is provided with an opening; the pole is arranged on the shell, and one end of the pole extends to the inside of the opening, and the other end of the pole extends to the outside of the shell; the tabs are connected with the winding core, and the tabs extend to the inside of the opening and are electrically connected with the pole.

Preferably, the button-type lithium ion battery further includes an upper insulating sheet and a lower insulating sheet, which are respectively attached to the upper bottom surface and the lower bottom surface of the winding core.

Preferably, the shell includes a pedestal and a cover body, which are mutually cooperated to form the cavity.

Preferably, the cover body is provided with a liquid injection port and a seal which is capable of sealing the liquid injection port.

Preferably, the pole is arranged on the cover body.

Preferably, the material of the shell is aluminum.

Another object of the disclosure is to provide a method for fabricating a button-type lithium ion battery, the method including the following steps:

A, fabricating a winding core whose center is provided with a round hole, a center upright whose at least one end is provided with an opening, a pole and a shell which is internally provided with a cavity;

B, inserting the center upright into the round hole;

C, leading out a positive tab and a negative tab from the winding core;

the positive tab being welded on the shell through laser welding or ultrasonic welding;

the negative tab being welded on the pole through laser welding or ultrasonic welding or resistance welding;

D, putting the winding core in the cavity of the shell;

E, embedding the pole and a part of negative tab into the opening of the center upright; and F, sealing the cavity of the shell.

Preferably, the shell includes a pedestal, the pedestal is shaped by stretching and the cavity accommodating the winding core is formed.

Preferably, the shell further includes a cover body, and a liquid injection port and a through hole used for installing the pole are formed on the cover body by punching.

Preferably, the pole is embedded into the through hole, and sealant is injected between the outer wall surface of the pole and the inner wall surface of the through hole.

The disclosure at least has the following beneficial effects:

According to the disclosure, the relatively thick pole is connected with the winding core and then embedded into the center upright so that the space inside the center upright is sufficiently utilized, the effect of reducing the whole thickness of the shell is taken and the effective utilization space of the battery is increased, thereby improving the capacity of the lithium ion battery. Compared with the prior art, equivalent battery volume has higher battery capacity.

DESCRIPTION OF THE EMBODIMENTS

Figure 1:
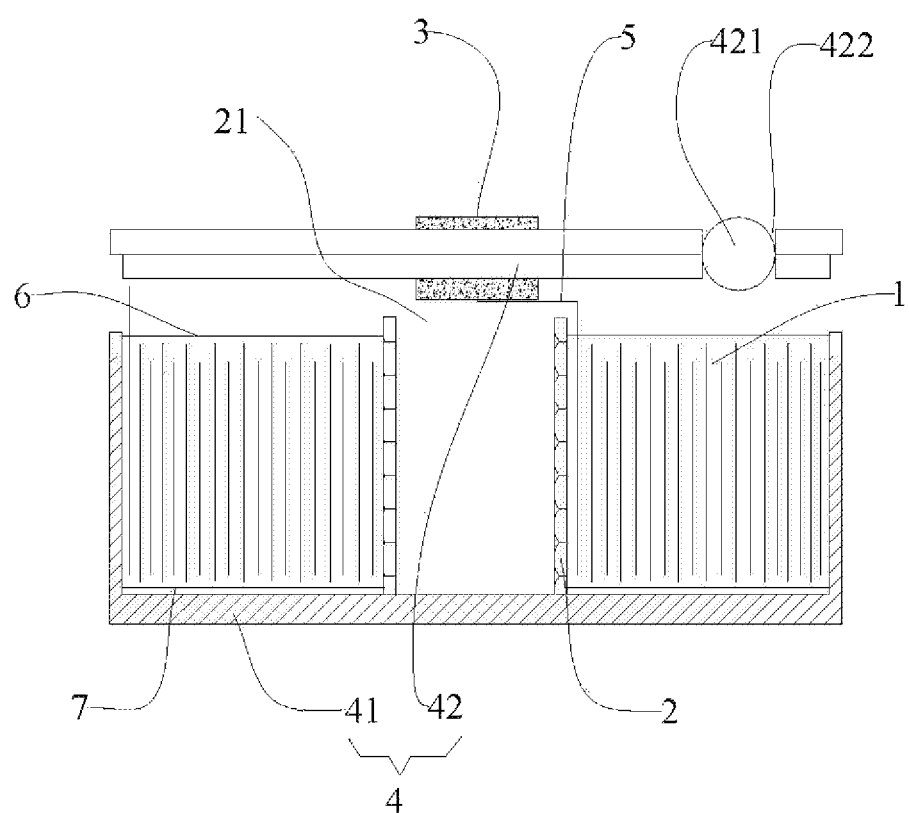
FIG. 1 is a sectional view of a button-type lithium ion battery.

This part will describe embodiments of the disclosure in detail, preferred embodiments of the disclosure are shown in drawings, and the function of drawings is to supplement the description of the word parts of the specification with drawings, so that people can intuitively and vividly understand each technical feature and the overall technical solution of the disclosure, but it cannot be understood as limiting the protective scope of the disclosure.

In the description of the disclosure, it is to be understood that the description of the orientation, for example, the orientation or position relationship indicated by upper, lower, front, back, left, right and others is based on the orientation or position relationship shown in the drawings, which is only for conveniently describing the disclosure and simplifying the description, rather than indicating or implying that the device or element must have a specific orientation and is constructed and operated in a specific orientation, and therefore cannot be understood as limiting the disclosure.

In the description of the disclosure, the meaning of several is single or plurality, the meaning of plurality is more than two, greater than, less than, exceeding and the like are understood as excluding the number itself, and the above, below and within are understood as including the number itself. If there is a description that the first and the second are only for the purpose of distinguishing the technical features, it cannot be understood as indicating or implying the relative importance or implicitly indicating the quantity of the indicated technical features or implicitly indicating the order of the indicated technical features.

In the description of the disclosure, unless otherwise specified, phrases such as setting, installation and connection shall be understood in a broad sense. Those skilled in the art can reasonably determine the specific meaning of the above phrases in the disclosure in combination with the specific content of the technical solution.

Figure 2:
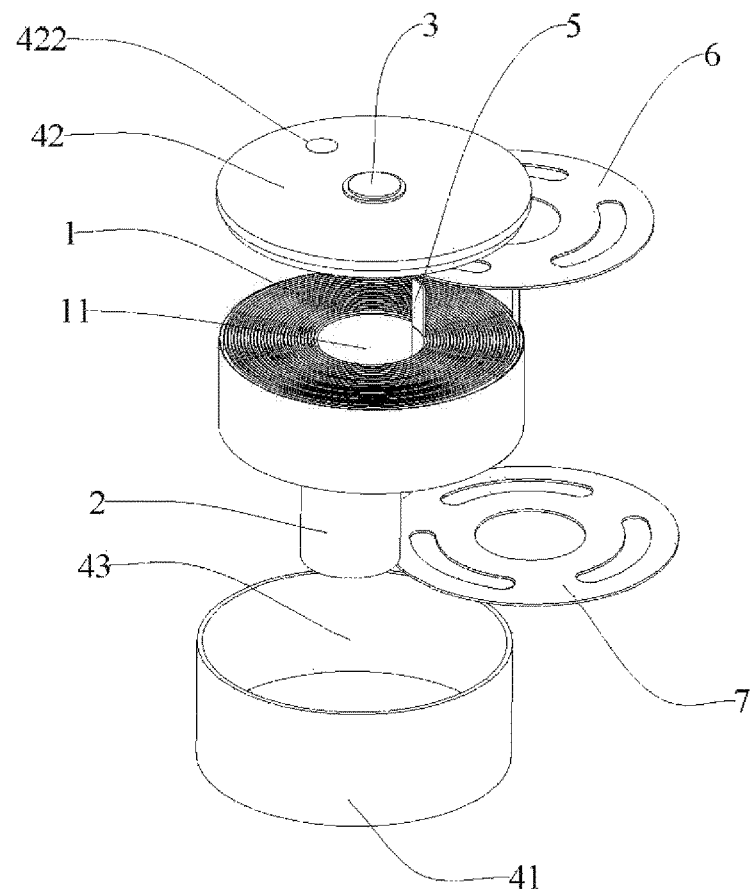
FIG. 2 is an exploded view of a button-type lithium ion battery.

Referring to FIG. 1 and FIG. 2, the button-type lithium ion battery includes a shell 4, a winding core 1, a center uptight 2, a pole 3 and tabs 5, wherein the shell is internally provided with a cavity 43; the winding core 1 is arranged in the cavity 43; at least one end of the center uptight 2 is provided with an opening 21; the pole 3 is arranged on the shell 4, and one end of the pole 3 extends to the inside of the opening 21, and the other end of the pole 3 extends to the outside of the shell 4; the tabs 5 are connected with the winding core 1, and the tabs 5 extend to the inside of the opening 21 and are electrically connected with the pole 3.

Referring to FIG. 2, in this example, the shell 4 includes a pedestal 41 and a cover body 42, which are mutually cooperated to form the cavity 43. The pedestal 41 and the cover body 42 which are of separation type allow the winding core 1 in the inside to be more easily encapsulated.

In this example, the space inside the center upright 2 is skillfully utilized, and the relatively thick pole 3 is connected with the winding core 1 and then embedded into the inside of the center upright 2. Without limitation of the pole 3, the top of the cover body 42 can be tightly arranged with the winding core 1, so as to relatively reduce the whole thickness of the cover body 42 and increase the utilization space of the battery. Compared with the prior art, the equivalent battery volume has higher battery capacity.

Referring to FIG. 2, in this example, the lithium ion battery further includes an upper insulating sheet 6 and a lower insulating sheet 7, which are respectively attached to the upper bottom surface of the lower bottom surface of the winding core 1. The insulating sheets can effectively isolate the winding core 1 from the cover body 42, thereby avoiding the accident short circuit inside the winding core 1 caused by exterior physical factors and increasing the stability of the winding core 1.

Referring to FIG. 1, in this example, the pole 3 is arranged on the cover body 42. The pole 3 is fixed and installed on the cover body 42 in advance, which is convenient for insulating treatment of the pole 3 and the cover body 42 in the process of production and improves the quality of the finished product.

Referring to FIG. 1, in this example, the cover body 42 is provided with a liquid injection port 422 and a seal 421 which is capable of sealing the liquid injection port 422. Electrolyte is injected into the winding core 1 through the liquid injection port 422. After the injection of electrolyte is completed, the seal 421 is used to seal the liquid injection port 422, so as to form the button-type lithium ion battery. The liquid injection port 422 is a small through hole. By adopting a manner of injecting electrolyte via the small through hole, the electrolyte is more sufficiently injected, thereby effectively avoiding that bubbles occur inside the lithium battery and improving the rate of finished products. As an example, the seal 421 is a steel ball, and the liquid injection port 422 can be sealed by using the steel ball. It is expected that in practical application, the seal 421 can be an aluminum ball, or the sealant can also be used to seal the opening, but not limited thereto.

As an example, the material of the cover body 42 is aluminum. In addition, the material of the cover body 42 can also be stainless steel, but not limited thereto. Aluminum is low in resistivity and small in density, so that the electrode has good conductivity and relatively small weight.

As an example, the material of the pole 3 is copper. The pole 3 in this example is long and thin, but selection of copper having good conductive performance as the pole 3 can also make the pole 3 have good conductive performance, thereby greatly reducing the internal resistance of the pole 3. Of course, the material of the pole 3 can also be other metal, for example, stainless steel, but not limited thereto.

Figure 3:
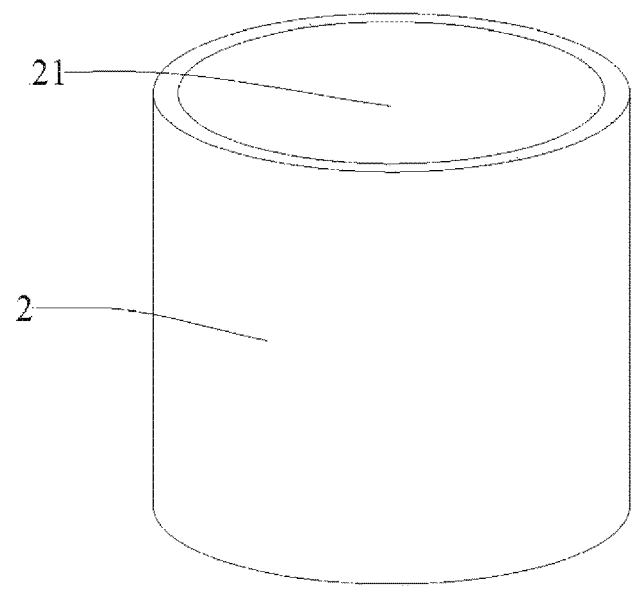
FIG. 3 is a three-dimensional structure diagram of a center upright.

As an example, as shown in FIG. 3, the center upright 2 is cylindrical. The cylindrical center upright 2 decreases the fabricating difficulty of the winding core 1 and meanwhile reduces the difference in positions between various components and increases the stability of installation. Of course, the center upright 2 can also be of other shapes, for example, can be rectangular, but not limited thereto.

As an example, the material of the center upright 2 is plastic. The plastic has the advantages of corrosion resistance, insulation and aging resistance, and prevents the components inside the center upright 2 from being damaged. Of course, the center upright 2 can also be made of other insulating materials, for example, rubber, but not limited thereto.

The disclosure further discloses a method for fabricating the above button-type lithium ion battery, including the following steps:

A, fabricating a winding core 1 whose center is provided with a round hole 11, a center uptight 2 whose at least one end is provided with an opening 21, a pole 3 and a shell 4 which is internally provided with a cavity 43;

B, inserting the center uptight 2 into the round hole 11;

C, leading out a positive tab and a negative tab from the winding core 1;

the positive tab being welded on the shell 4 through laser welding or ultrasonic welding;

the negative tab being welded on the pole 3 through laser welding or ultrasonic welding or resistance welding;

D, putting the winding core 1 in the cavity 43 of the shell 4;

E, embedding the pole 3 and a part of negative tab into the opening 21 of the center upright 2; and F, sealing the cavity 43 of the shell 4.

Through the method, the relatively thick pole is connected with the winding core and then embedded into the center uptight so that the space of the center upright is sufficiently utilized, the effect of reducing the whole thickness of the shell is taken and the effective utilization space of the battery is increased. Compared with the prior art, equivalent battery volume has higher battery capacity.

As an example, the shell 4 includes a pedestal 41, as shown in FIG. 1. The pedestal 41 is molded by using a stretching method, and the cavity 43 accommodating the winding core 1 is formed. Stretch molding has the advantages of high productivity and high material utilization rate.

Figure 4:
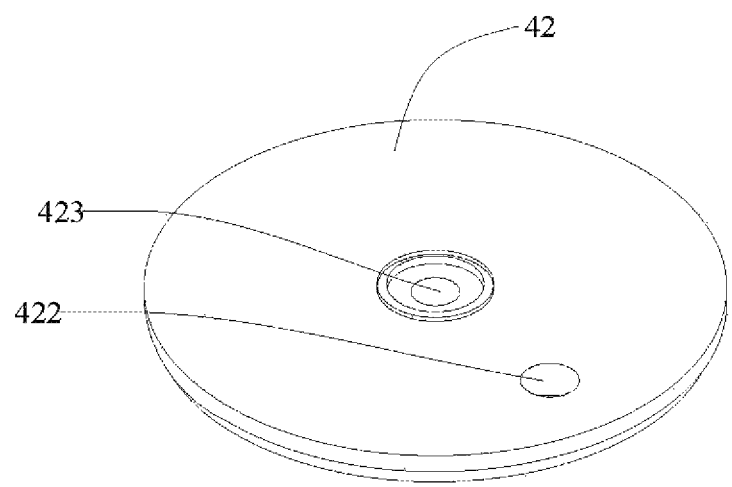
FIG. 4 is a three-dimensional structure diagram of a cover body of a shell.

As an example, the shell 4 further includes a cover body 42, as shown in FIG. 4. A liquid injection port 422 and a through hole 423 used for installing the pole 3 are formed on the cover body 42 by using a punching method. Punching is high in production efficiency, convenient to operate, and easy to implement mechanization and automation.

As an example, the pole 3 is embedded into the through hole, and sealant is injected in a gap between the outer wall surface of the pole 3 and the through hole 423 through an injection molding manner. The sealant insulates the pole 3 from the shell 4 to prevent the short circuit inside the battery from occurring.

As an example, in step F, the following step is also included: electrolyte is injected from the liquid injection port 422 which is sealed by using the seal 421.

As an example, the pole 3 is protruded from the surface of the cover body 42. The protruded pole 3 can ensure good electrical contact with the exterior. Of course, the pole 3 can also be embedded into the cover body 42, but not limited thereto.

Examples of the disclosure are described in detail above in combination with drawings, but the disclosure is not limited to the above examples. Within the knowledge scope of a person of ordinary skill in the art, various variations can also be made without departing from the spirit of the disclosure.

What is claimed is:

1. A method for fabricating a button-type lithium ion battery, comprising the following steps:
    fabricating a winding core provided with a round hole at center, a center uptight which is a hollow tube having a fully enclosed side wall, an end of the side wall forming an opening, a pole and a shell internally provided with a cavity;
    inserting the center uptight into the round hole;
    leading out a positive tab and a negative tab from the winding core;
    welding the positive tab on the shell through laser welding or ultrasonic welding;
    welding the negative tab on the pole through laser welding or ultrasonic welding or resistance welding;
    placing the winding core in the cavity of the shell;
    embedding the pole and a part of the negative tab into the opening of the center upright; and
    sealing the cavity of the shell;
    wherein the shell comprises a pedestal and a cover body mutually cooperated to form the cavity;
    the pole is arranged on the cover body; and
    a liquid injection port and a through hole used for installing the pole are formed on the cover body by punching;
    wherein the pole and the part of the negative tab enter an interior of the center uptight only through the opening; the center upright is made of insulating material selected from a group consisting of plastic and rubber; and the pole is made of copper;
    wherein the pedestal is shaped by stretching, and forms the cavity configured for accommodating the winding core.

2. The method for fabricating the button-type lithium ion battery according to claim 1, wherein the pole is embedded into the through hole, and sealant is injected between an outer wall surface of the pole and an inner wall surface of the through hole.

3. The method for fabricating the button-type lithium ion battery according to claim 1, wherein the button-type lithium ion battery further comprises an upper insulating sheet and a lower insulating sheet attached to an upper bottom surface and a lower bottom surface of the winding core, respectively.

4. The method for fabricating the button-type lithium ion battery according to claim 1, wherein the cover body is provided with a seal; the seal is capable of sealing the liquid injection port.

5. The method for fabricating the button-type lithium ion battery according to claim 1, wherein a material of the shell is aluminum.

6. The method for fabricating the button-type lithium ion battery according to claim 1, wherein the negative tab comprises a first part and a second part which are perpendicular to one another, the first part extends along a direction parallel to the side wall of the center uptight, and the second part is the part of the negative tab which enters an interior of the center uptight.

* * * * *